United States Patent [19]

Edwards et al.

[11] Patent Number: 4,703,376
[45] Date of Patent: Oct. 27, 1987

[54] APPARATUS FOR LOADING AND RETRACTING MAGNETIC HEAD IN A DISK DRIVE

[75] Inventors: John R. Edwards, Mountain View; George D. Popov, Milpitas; John B. Philbrick, Fremont, all of Calif.

[73] Assignee: LaPine Technology, Milpitas, Calif.

[21] Appl. No.: 778,883

[22] Filed: Sep. 23, 1985

[51] Int. Cl.$^4$ .......................... G11B 5/48; G11B 5/54
[52] U.S. Cl. ..................................... 360/105; 360/106
[58] Field of Search ................. 360/105, 106, 86, 137

[56] References Cited

U.S. PATENT DOCUMENTS

| | | | |
|---|---|---|---|
| 3,646,536 | 2/1972 | Bleiman | 360/105 X |
| 4,376,294 | 3/1983 | Meier et al. | 360/105 |
| 4,484,241 | 11/1984 | Brende et al. | 360/137 X |
| 4,562,500 | 12/1985 | Bygdnes | 360/86 X |

FOREIGN PATENT DOCUMENTS

| | | | |
|---|---|---|---|
| 0020177 | 12/1980 | European Pat. Off. | 360/106 |
| 3404231 | 8/1985 | Fed. Rep. of Germany | 360/106 |
| 59-124067 | 7/1984 | Japan | 360/105 |
| 197708 | 5/1977 | U.S.S.R. | 360/105 |

OTHER PUBLICATIONS

IBM-TDB vol. 16, No. 10 Mar. 1974, by Cuzner et al. Recording and/or Reproducing Head Assembly.

*Primary Examiner*—Stuart N. Hecker
*Assistant Examiner*—Alyssa H. Bowler
*Attorney, Agent, or Firm*—Nathan N. Kallman

[57] ABSTRACT

A load mechanism for loading and unloading magnetic heads relative to a magnetic disk includes a rotatable comb-like structure having lift pins for coacting with the head supporting flexures to maintain the heads securely spaced from the surfaces of the disks during the unload mode and to allow the heads to assume the transducing position during the load mode.

10 Claims, 3 Drawing Figures

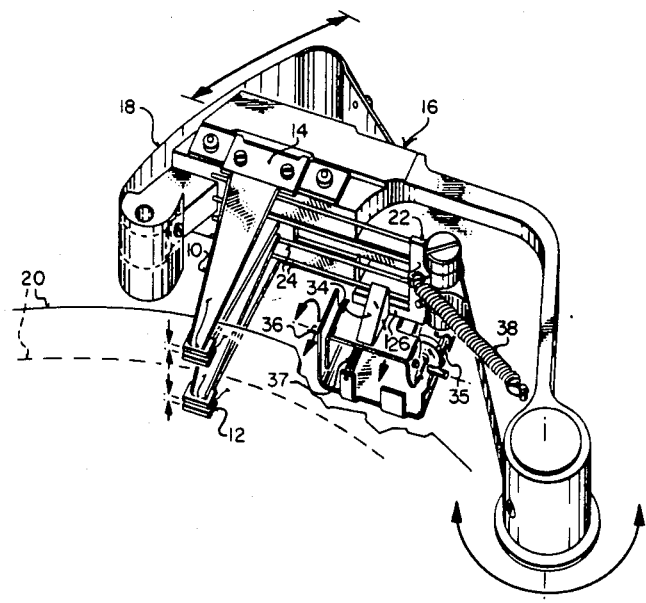
FIG_1
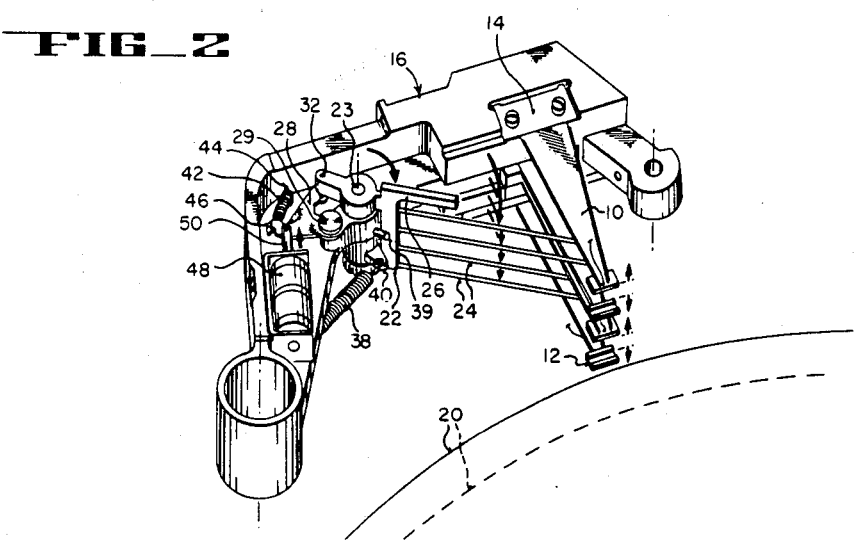
FIG_2

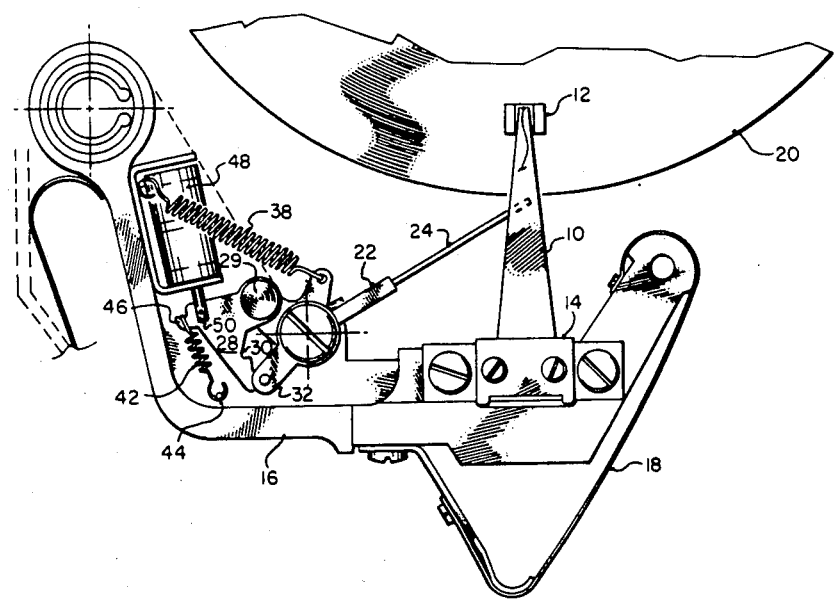
FIG_3

APPARATUS FOR LOADING AND RETRACTING MAGNETIC HEAD IN A DISK DRIVE

TECHNICAL FIELD

This invention relates to a novel and improved head arm assembly and in particular to a head load and unload mechanism used in a disk drive.

BACKGROUND ART

Presently known disk drives employ magnetic heads that fly at a predetermined height relative to a rotating disk during transducing operation. Since the magnetic transducers fly very closely to the disk surface, less than 20 microinches for example, a major problem that is experienced is that of head crash, which occurs when the topography of the disk or a spurious distrubance causes the head to impact the disk. Head crashes cause serious damage to the heads and disks, as well as loss of data. Although head crashes are known to occur during drive operation and disk rotation, head crash has also been observed in small mobile and portable disk drives which are used in portable computers, when the computer or disk drive is transported and moved. Therefore it is desirable and necessary to prevent the movement of the magnetic heads during transport of the drive, when the drive is nonoperational, to avoid the problem of head crash. It also is desirable to provide a simple means for loading the heads at a predetermined rate to a precise height relative to the disk surfaces.

SUMMARY OF THE INVENTION

An object of the invention is to provide a head load mechanism that secures magnetic heads in spaced relation to the surfaces of magnetic disks when a disk drive is nonoperational, and to load magnetic heads at a predetermined rate prior to operation.

In accordance with this invention, a head load mechanism incorporates a comb-like structure having lift pins that coact with magnetic head flexures to lift the heads, so that they are securely fixed during non-operation of a disk drive, ad to release the head flexures at a predetermined rate for flying in transducing relation with the magnetic disks during operation of the disk drive. The flexures and comb-like structure are coupled to a rotatable arm assembly, which is moved to enable the heads to be positioned over the magnetic disks for accessing data tracks and to position the heads in proper spaced relationship to the disk surfaces. The comb-like structure is independently rotatable about a fixed post attached to the arm asssembly. As the arm advances inward toward the disk inner track, the comb structure is urged into a locked position at which the spring loaded head flexures are lowered and allowed to fly over the rotating disks. Upon withdrawal of the arm from the disks, the comb-like structure is unlatched by energizing a latch mechanism solenoid when power-off condition is sensed. As a result, during power-off the lift pins hold the flexures securely spaced from the disk surfaces so as to preclude head crashes with the disk surfaces.

BRIEF DESCRIPTION OF THE DRAWINGS

The invention will be described in greater detail with reference to the drawings in which:

FIG. 1 is an isometric view taken from the top of the head load mechanism, with the heads loaded to the disks, in accordance with this invention;

FIG. 2 is an isometric view taken from the bottom of the head load mechanism with the heads lifted and spaced from the disks; and FIG. 3 is a top plan view of the novel head load mechanism, with part of the head arm removed for clarity.

Similar numerals refer to similar elements throughout the drawings.

With reference to FIGS. 1-3, a multiplicity of flexures 10 supporting magnetic heads 12 at one end are attached by means of a mount element 14 to an arm 16. The flexures are spring loaded with a predetermined gram load force towards the surfaces of magnetic disks 20 that coact with the magnetic heads for transducing data during operation of the disk drive. The arm is rotatable by means of a resilient steel band 18 (FIG. 3) that is wrapped around a post on which the arm is seated. The other end of the steel band 18 is tied to a bidirectionally movable shaft of a stepper motor (not shown) which is energized, when the disk drive is powered, to actuate the band 18 and thereby rotate the arm.

In the nonoperational mode, the flexures and heads are securely spaced from the surface of magnetic disks 20, as represented in FIG. 2. The spacing is effectuated by means of a comb-like structure 22 having a multiplicity of parallel lift pins or fingers 24, each finger being associated with a respective flexure 10. The structure 22 is disposed on a fixed post 23 that is attached to the arm, and is rotatable around the post. The comb-like structure 22 is retained securely in a head unload position and the flexures are disposed in spaced nontransducing relation relative to the disks.

In operation, when the disk drive is initialized by switching "Power On," the stepping motor is energized causing the arm to rotate in response to the winding of the bank 18. The arm assembly advances toward the disk surfaces for performing the track and address seek functions and for writing or reading data on the disks.

As the arm is moved forward, a solenoid 35 is energized in response to a pulse signal from a counter in the electronic circuitry associated with the drive, and causes a stop element 34 to rotate around a supporting rod 36, so that the stop element moves to an upright position from a position it has when the drive is nonoperational.

The comb structure 22 also is formed with a trigger element 26 that contacts the upright stop element 34 when the heads reach a predetermined data track. As the arm continues to rotate and move the heads radially forward across the disk, the trigger 26 of the comb structure which is engaged with the stationary stop element 34 causes the comb structure and the lift pins 24 to move back to the arm structure as depicted in FIG. 1. As the lift pins are urged towards the arm and the area of the mount 14, the lift pins lose contact with the flexures, allowing the flexures to be free of restraint by the pins. At the point when the comb fingers or lift pins are retracted fully, the heads are spring loaded to the disks and in transducing relation with respective surfaces of the disks.

When the comb structure 22 is displaced so that the fingers are fully withdrawn, in the head load position, an ear 32 of the comb assembly engages the cam surface of a rotatable latch element 28 which locks the comb in a secure position. The latch 28 rotates about a pivot point 29. A small spring 42, coupled to a fixed pin 44 and a hook 46 formed in the latch, serves to maintain the latch element and thus the comb structure in a locked position. In addition, a spring loaded pin 50 of a solenoid 48 is extended when the solenoid 48 is energized to keep the latch in position. With the latch so positioned, a compression spring 38 is extended and has the potential energy to retract the comb to the unload position. The latch 28 is fixed rigidly in position to restrain the fingers or lift pins from contact with the flexures. With the lift fingers withdrawn and the heads loaded to the disks, the solenoid 35 which energized the stop element 34 is deenergized, and a spring 37 returns the element to a flat position.

To return the comb-like structure to the unload position and to lift the heads from the disk surfaces when the drive becomes nonoperational, the solenoid 48 is energized causing the spring loaded solenoid pin 50 to retract. The latch 28, which is coupled to the solenoid pin, is released so that the comb ear 32 is disengaged from the latch. As a result, the large compression spring 38, which was under tension during the head load mode, acts to pull the comb structure 22 back to the initial unload position, as illustrated in FIG. 2. The spring 38 is attached to the arm assembly at one end, and at its other end to a protruding portion 40 of the comb. As the comb structure is rotated, the flexures and heads are lifted away from the disks by the lift pins 24 and become sufficiently spaced from the surfaces of the disks in rigid position so that the chances of head crashes are virtually eliminated. A limit pin 39 limits the extent of travel of the comb to a predetermined distance relative to the length of the flexures.

By virtue of this invention, the lift pins of the comb are controlled to lift the head flexures to a precise position, and the rate of lift is proportional to the velocity of the pins in their rotational path. The stepper motor controls the rate at which the heads are loaded. When unloaded, the lift pins securely support the flexures at a point about ⅔ from the "home" or unloaded position to the end of the flexures supporting the magnetic heads. When unloaded, the flexures are restrained from vertical movement, in the event that the disk drive receives any impact or shock, and thus head crashes are eliminated. In addition, the problem of stiction is avoided as a result of the securely spaced flexures.

What is claimed is:

1. An apparatus for loading and retracting magnetic heads relative to the surfaces of magnetic disks comprising:
    a rotatable arm;
    a plurality of head flexures supporting a multiplicity of magnetic heads mounted to said arm;
    a comb-like structure having a plurality of lift pins extending adjacent to respective surfaces of said flexures;
    means for moving said comb structure and lift pins so that in a first position of said pins said heads are loaded relative to rotating disks, and in a second position of said pins said heads are lifted and unloaded, so that said flexures are securely maintained in spaced relation to said disks, said moving means comprising means for retracting said lift pins fully so that they lose contact with said flexures whereby said magnetic heads are loaded for transducing relation relative to said magnetic disks, and means for engaging said lift pins with said flexures so that the flexures and heads are lifted away from the disks and retained in a rigid position during the unloaded or nonoperational mode of the disk drive.

2. An apparatus for loading and retracting magnetic heads relative to the surfaces of magnetic disks as in claim 1, including means for rotating said arm comprising a motor and a resilient band coupled to said motor and said arm.

3. An apparatus for loading and retracting magnetic heads relative to the surfaces of magnetic disks as in claim 1, including a latch mechanism for securing the comb in said first position.

4. An apparatus for loading and retracting magnetic heads relative to the surfaces of magnetic disks as in claim 3, wherein said latch mechanism includes a cam surface and said comb structure includes an ear portion for engaging said cam surface.

5. An apparatus for loading and retracting magnetic heads relative to the surfaces of magnetic disks as in claim 3, including a first solenoid having an extending pin for holding said latch mechanism in a fixed position.

6. An apparatus for loading and retracting magnetic heads relative to the surfaces of magnetic disks as in claim 5, including a small compression spring coupled to a hook of said latch mechanism for maintaining said latch in position during the head load mode.

7. An apparatus for loading and retracting magnetic heads relative to the surfaces of magnetic disks as in claim 1, wherein said comb includes a trigger element, and further including a stop element for mechanically engaging said trigger element when said arm is rotated toward said disks to urge said comb and said lift pins to move to said arm so that said flexures are released from contact with said lift pins.

8. An apparatus for loading and retracting magnetic heads relative to the surfaces of magnetic disks as in claim 7, including a support rod about which said stop element is pivotable, and a solenoid for actuating said stop element to pivot about said rod.

9. An apparatus for loading and retracting magnetic heads relative to the surfaces of magnetic disks as in claim 1, including a first compression spring that is tensed when said pins are retracted to said first position in the head load mode, said spring retracting said comb to said second position so that said lift pins securely maintain said flexures in spaced relation relative to said disks.

10. An apparatus for loading and retracting magnetic heads relative to the surfaces of magnetic disks as in claim 1, including a limit pin for limiting the movement of said comb to a predetermined position relative to the length of the flexures when the heads are lifted and unloaded.

* * * * *